Feb. 24, 1970 C. B. KIMBALL ET AL 3,496,650
AIR CUSHION PROPRIOCEPTIVE MOTION SYSTEM
Filed Aug. 30, 1967 4 Sheets-Sheet 1

Charles B. Kimball
Christopher A. Magill
INVENTORS

BY

ATTORNEY

Feb. 24, 1970      C. B. KIMBALL ET AL      3,496,650
AIR CUSHION PROPRIOCEPTIVE MOTION SYSTEM
Filed Aug. 30, 1967      4 Sheets-Sheet 2
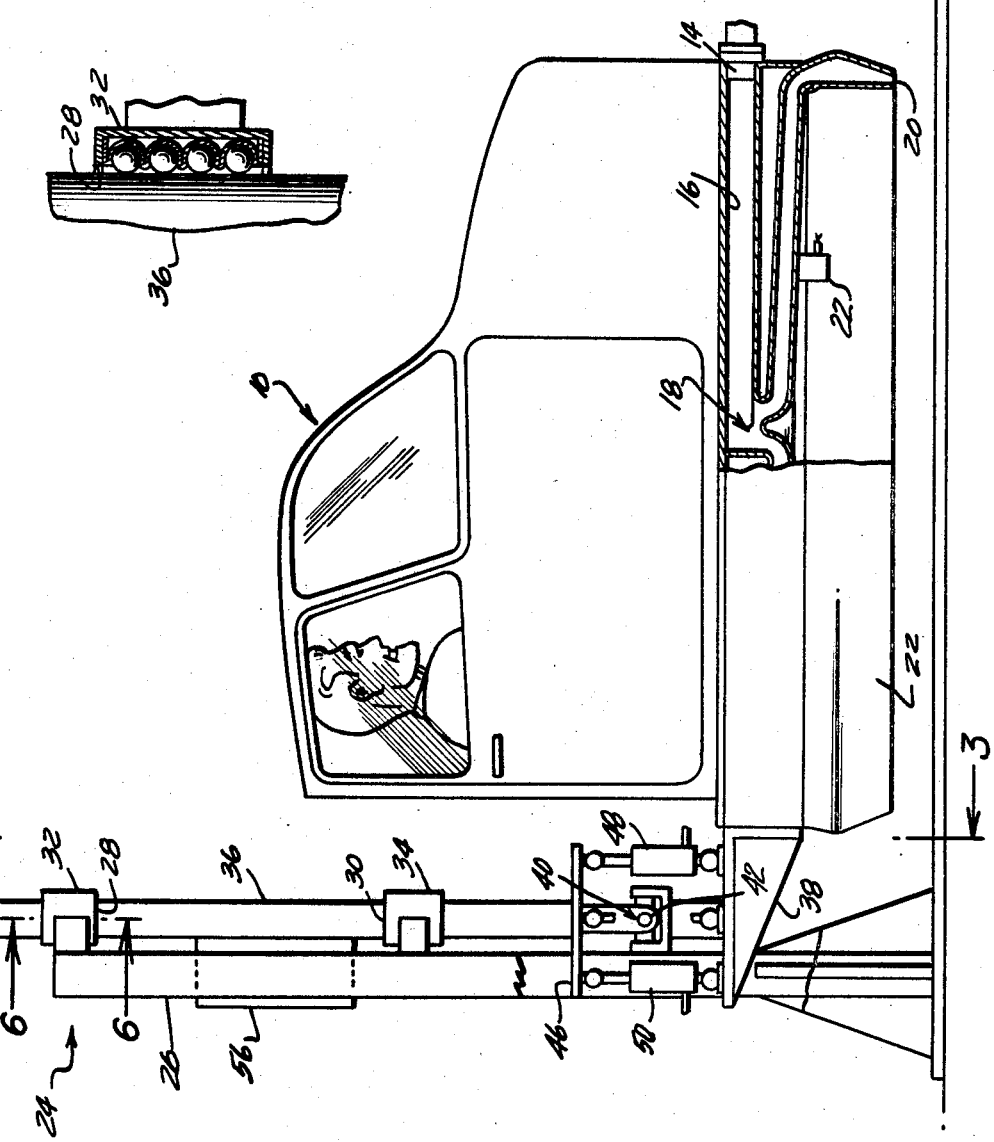
Charles B. Kimball
Christopher A. Magill
INVENTORS
BY *John W. Pease*
ATTORNEY Feb. 24, 1970   C. B. KIMBALL ET AL   3,496,650
AIR CUSHION PROPRIOCEPTIVE MOTION SYSTEM
Filed Aug. 30, 1967   4 Sheets-Sheet 3
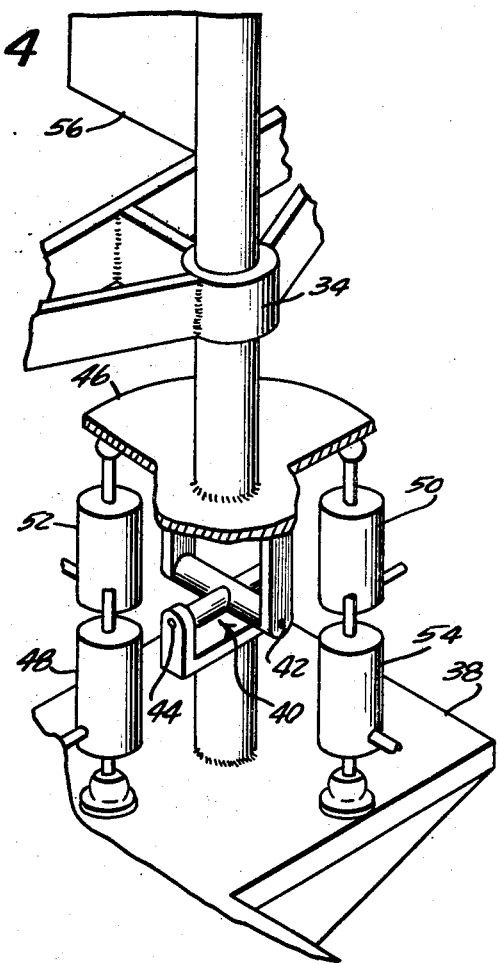
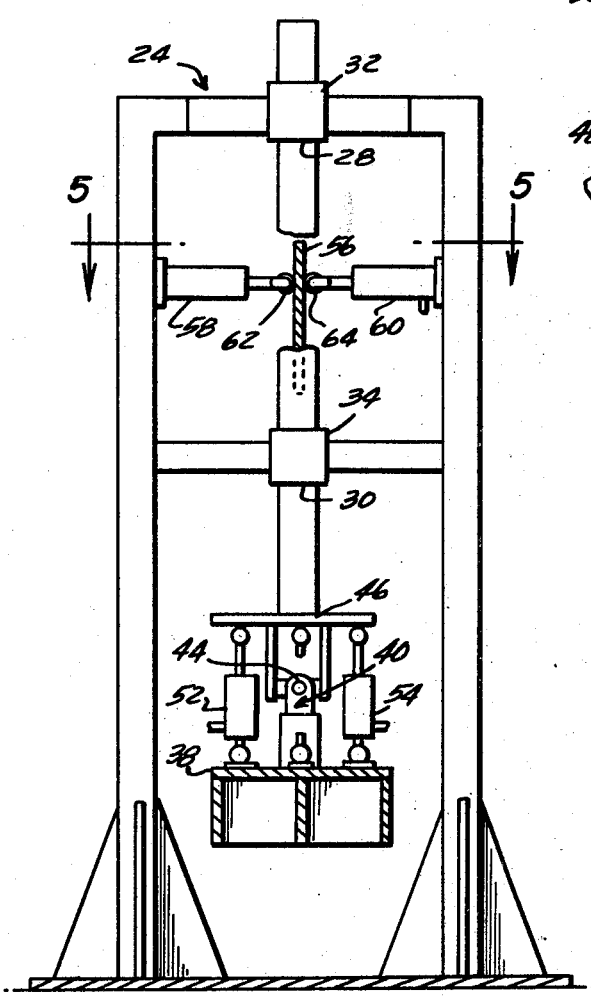
Charles B. Kimball
Christopher A. Magill
INVENTORS
BY
ATTORNEY

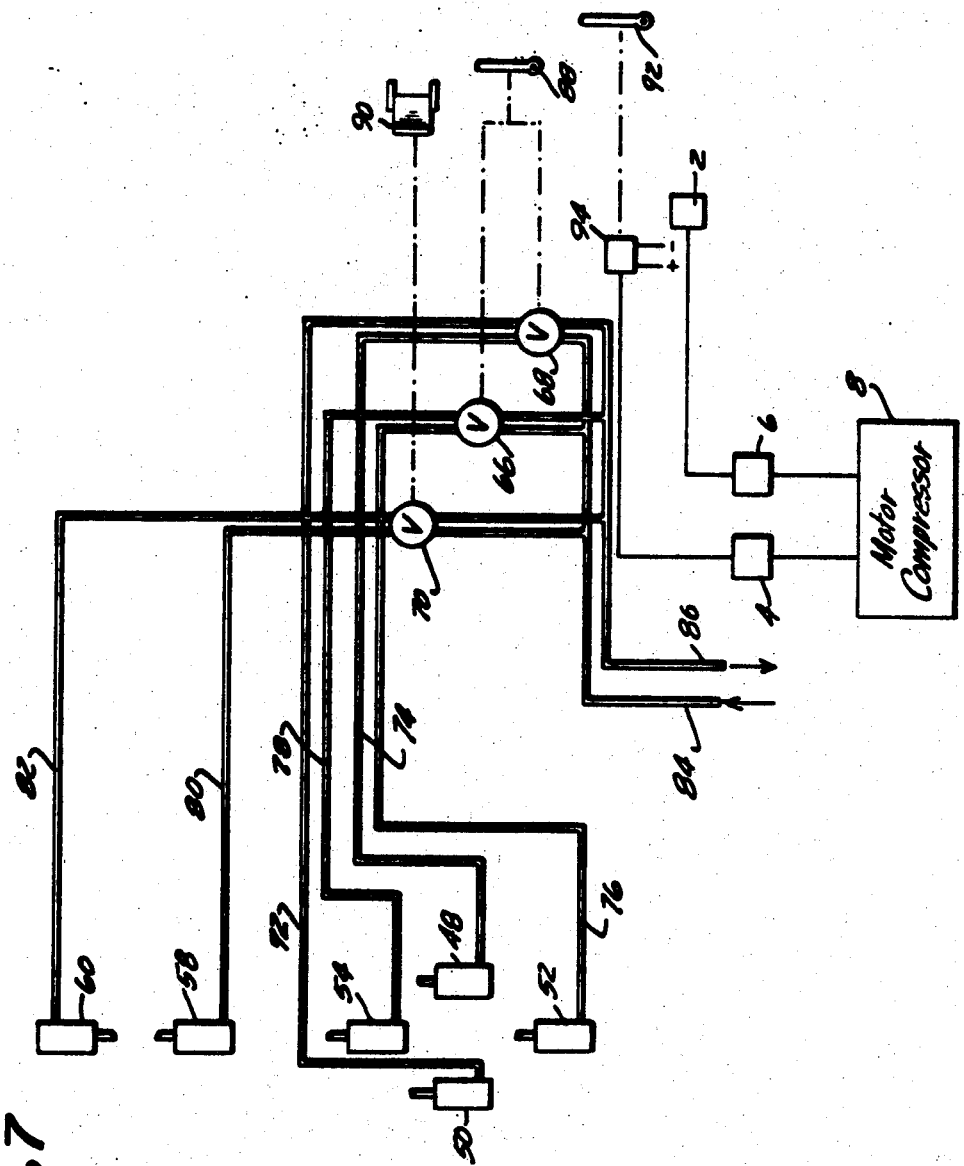

United States Patent Office 3,496,650
Patented Feb. 24, 1970

1

3,496,650
AIR CUSHION PROPRIOCEPTIVE MOTION
SYSTEM
Charles B. Kimball, Winter Park, and Christopher A. Magill, Orlando, Fla., assignors to the United States of America as represented by the Secretary of the Navy
Filed Aug. 30, 1967, Ser. No. 665,210
Int. Cl. G09b 9/08, 9/06
U.S. Cl. 35—12                                     7 Claims

ABSTRACT OF THE DISCLOSURE

This invention relates to trainer simulators of proprioceptive motions of vertical ascent and attitude for the training of personnel in three dimensional flight characteristics of vehicles such as aircraft and submarines. In particular, the invention relates to an improved trainer in which an air cushion support vehicle provides support for the body of the trainer, its equipment and crew, as well as its vertical motion and wherein several separate nonsupport actuator means are provided for variation of several attitudes of the trainer, such as yaw, roll and pitch, each adjustible without affecting adjustment of the other.

The invention will be described by way of example in relation to its application to an aircraft simulation trainer.

BACKGROUND OF THE INVENTION

In such a ground trainer simulator, the object is to provide the pilot with typical acceleration cues such as he would receive in actual flight so that he may relate the sensations of flight in relation to flight instrument readings displayed on panels in the trainer body.

Flight simulators and trainers having cockpit, i.e., trainer body, motion for adding realism to on-ground flight training have in the past relied upon heavy, bulky and costly equipment to support and actuate the considerable weight of trainer, equipment and personnel required. The noise of operation of such equipment has been a factor reducing the realistic effect of the equipment. Also the controls necessary for actuation of the equipment have of necessity in many instances been complicated.

It is an object of this invention to provide an improved trainer simulator readily adapted to classroom installation and of reduced cost, bulk, weight and noise factors.

SUMMARY OF THE INVENTION

Basically the subject invention provides in a trainer for simulation of proprioceptive motions the improvements combining air cushion support for the entire weight of the trainer, equipment and crew, and ground supported actuating means directed solely to the application of cue motions to the trainer, the actuating means being constructed, positioned and arranged to provide unobstructed view from the forward end of the trainer and selective control of each cue movement without affecting the settings of the remaining cue movement controls.

Other objects and advantages will appear from the following description of an example of the invention when considered in connection with the accompanying drawings, and the novel features will be particularly pointed out in the appended claims.

BRIEF DESCRIPTION OF THE DRAWINGS

FIG. 2 is a side elevation, with parts broken away and shown in section;

2

Figure 5:
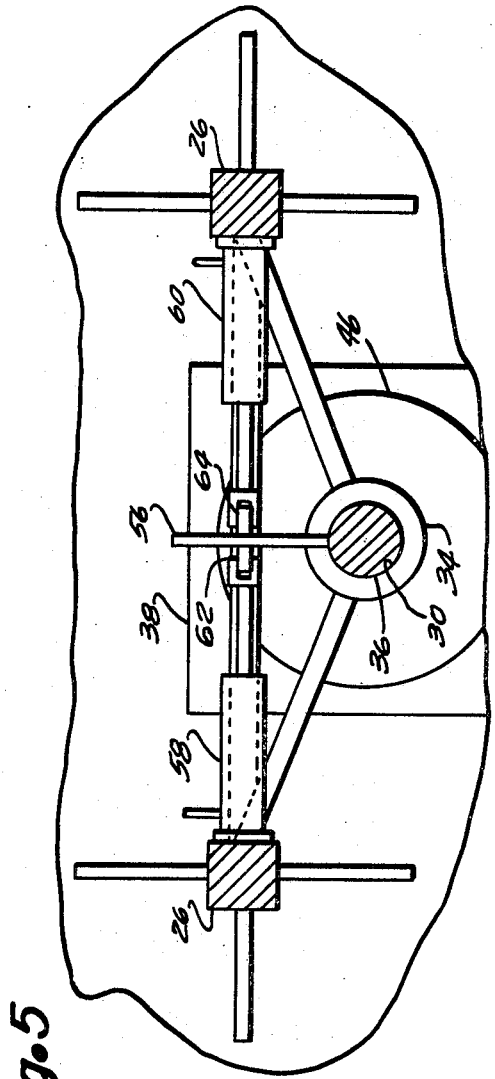

FIG. 3 is a cross-sectional view taken on the line 3—3 of FIG. 2 with parts broken away and shown in section;
FIG. 4 is a fragmentary perspective view of the universal joint mechanism and its associated hydraulic piston assembly;
FIG. 5 is a sectional view taken on the line 5—5 of FIG. 3;
FIG. 6 is a sectional view taken on the line 6—6 of FIG. 2; and
FIG. 7 is a simplified diagrammatic view of the air and hydraulic control system for the trainer of FIGS. 1–6.

DESCRIPTION OF THE PREFERRED EMBODIMENT

Figure 1:
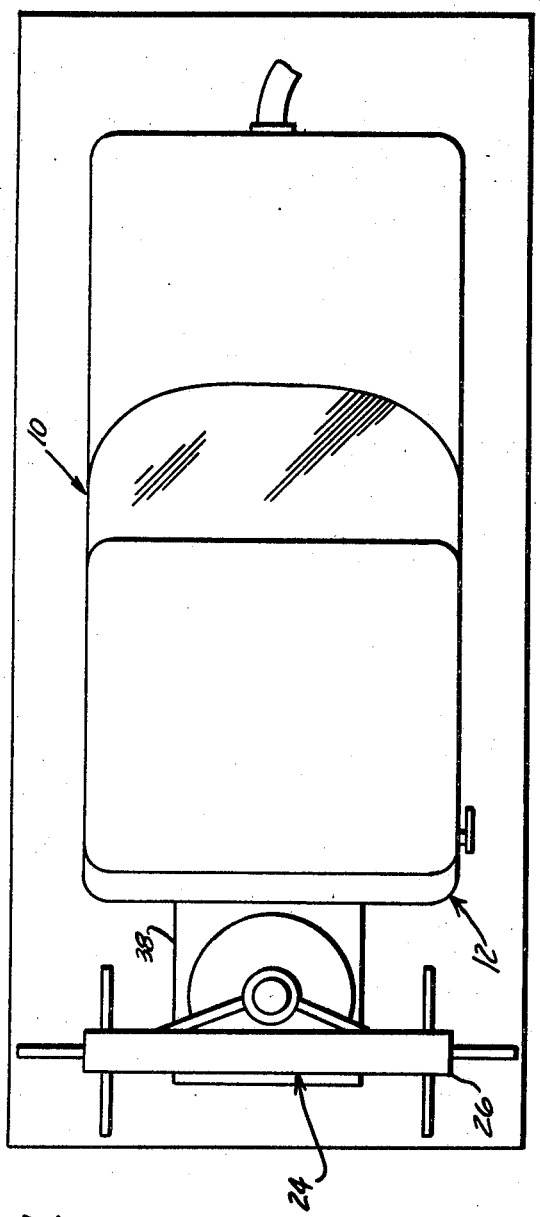
FIG. 1 is a plan view of an aircraft cockpit trainer simulator incorporating the invention.

Referring to FIGS. 1–3 of the drawing, there is shown a trainer body 10 which in this example is indicated as a cockpit portion of an aircraft in which the aircraft controls and instrumentation are located together with the operating personnel. In a typical trainer the weight of the trainer body and its contents could be in the area of 5,000 pounds. Conventionally, such units are mounted on hydraulically or screw actuated support means and are maneuvered through cue motions of ascent, roll, pitch and yaw on and by such support equipment. Quite obviously because of the trainer body weight involved, such support-actuating equipment must itself be of considerable bulk and weight.

In accordance with this invention, the support and actuating functions are provided by separate cooperatively arranged equipments of considerably less bulk and weight than that required in the conventional equipment mentioned.

Thus, as shown in FIG. 2 the trainer body 10 is supported on an air cushion vehicle 12. Any suitable air cushion vehicle may be employed. The particular vehicle shown by way of example is of the annular jet type with peripheral jet skirt. Airflow is provided to the vehicle from an axial flow motorized compressor 8 through an inlet nozzle 14 and duct 16 to distribution chamber indicated at 18 and thence through an annular jet 20 adjacent the peripheral flexible skirt indicated at 22. In operation the vehicle is raised and lowered by variation of airflow to the vehicle to effect variation in ascent attitude of the vehicle 12 and its supported trainer body 10. A manually operated override control 4 (see FIG. 7) is provided for this purpose. At other times airflow is automatically controlled by automatic control 6 on the air compressor 8 in conjunction with a pressure sensor unit 2 located in the air cushion vehicle to maintain an air pressure in the air cushion vehicle sufficient to support the total load of vehicle and trainer. The cue motions of pitch, roll and yaw ground are provided by ground supported actuator means indicated generally at 24 (see FIGS. 2, 3 and 4). The actuator means 24 includes a ground supported frame 26 formed with vertically aligned apertures 28 and 30 in which are provided guide bearings 32 and 34, preferably of ball bearing type (see FIG. 6), to slidably receive a vertical column member 36. The column 36 is connected to an extended portion 38 of the air cushion vehicle 12 by a universal joint 40 having a pivot axis pin 42 providing for pitch motion and a pivot axis pin 44 providing for roll motion of the vehicle 12 and its trainer body.

Suitable actuators and a flanged mounting are provided to provide pitch and roll trust. Thus, in the embodiment shown a flange 46 is fixed by welding or other suitable means to the column 36 to slidably move and rotate therewith and actuators 48, 50, 52 and 54 (FIGS. 2, 3 and 4) are pivotally connected between the flange 46 and vehicle extension 38. Pitch actuators 48 and 50 are mounted in the vertical plane of the axis of roll pin 44 to provide pivotal action of the vehicle 12 about the pitch axis pin 42 and roll actuators 52 and 54 are mounted in the vertical plane of pitch axis pin 42 to provide pivotal action of the vehicle 12 about the roll axis pin 44.

To actuate the trainer selectively in yaw attitude, a fin plate 56 is fixed as by welding or other suitable means to the column 36 in vertical laterally projecting position and yaw actuators 58 and 60 (see FIG. 5) are mounted in the frame 26 and directed to engage opposite side of the fin plate 56. In this arrangement the fin plate is made sufficiently long such that a part of the fin plate will always be engaged by the actuators 58 and 60 regardless of the vertical slidable position of the column 36 in the frame 26. The extendable ends of actors 58 and 60 are preferably provided with rollers 62 and 64 to engage the fin plate 56.

As shown diagrammatically in FIG. 7 valve control means 66, 68 and 70 are provided to control the positions of the respective pairs of actuators 48–50, 52–54 and 58–60, the valves being connected to the actuators by fluid conduits 72–82 as indicated and to fluid pressure source and return conduits indicated at 84 and 86. Valves 66 and 68 control respectively the pitch and roll of the trainer and are actuated as indicated from a control stick 88. Valve 70 controlling yaw is actuated from the rudder control indicated at 90. As herein before stated the motorized compressor 8 is provided with a pressure sensitive regulator 6 connected to a pressure sensor 2 to automatically maintain load support air pressure in the air cushion vehicle under static condition of vertical ascent attitude. In addition a manually operable override control 4 is provided to vary the ascent attitude of the trainer as desired. The override control connected to the motorized compressor 8 is actuated by a manual control 92 through suitable means such as a relay 94. It is to be understood that this invention is not concerned with the actuators and compressor control means per se and the arrangement shown to describe the invention is intentionally simplified. For example, the controls shown do not include a computer normally interposed between the aircraft control actuators and motion hydraulic actuators. The control system in each trainer will depend upon the intended application of the trainer and may include dual control systems of considerable sophistication.

OPERATION

In operation the overriding control 4 is actuated to increase or decrease air pressure in the air cushion vehicle to selectively adjust the vertical ascent position of the trainer and to provide motion cues of ascent. At other times the pressure sensitive automatic governor 6 operates to maintain desired air support of the trainer. Ascent limit switches (not shown) may also be provided to augment the action of the automatic ascent control if desired. Such switches can be mounted on the frame 26 and column 36.

Variation in the ascent attitude of the trainer varies the slidable position of the column 36 in the frame 26 but does not vary the relative attitude of flange 46 and extension 38 of the air cushion vehicle. Thus, variation of ascent attitude has no effect on the adjusted relation of the roll and pitch actuators. Also in view of the slidable arrangement of plate 56 and its yaw actuators 58 and 60 adjustment of the latter is not affected by ascent attitude adjustment. Adjustment of roll, pitch or yaw actuators has no effect on the remaining actuators because each of the axes, roll, pitch and yaw are normal to each other. In other words, adjustment of any attitude can be varied without requiring readjustment of another attitude.

Advantages of the subject invention are derived from the combination of the relatively light air cushion support vehicle and the smaller and lighter hydraulic actuator equipment required. The relatively light air cushion vehicle accomplishes the heavy lift and support requirement formerly accomplished by heavy hydraulic, screw, lever and cam arrangements mounted on supports of substantial weight. The smaller and lighter hydraulic actuator equipment is made possible by the fact that the actuators are not performing the function of support and are working against a considerably reduced friction force. In addition to lowering the initial cost, bulk and weight of the equipment required, the invention also reduces required maintenance and prolongs the life of the equipment.

It will be understood that various changes in the details, materials, and arrangements of the parts, which have been herein described and illustrated in order to explain the nature of the invention, may be made by those skilled in the art within the principle and scope of the invention as expressed in the appended claims. In particular it will be noted that double acting hydraulic actuators can be provided in place of the pairs of actuators provided in this preferred embodiment of the invention.

The invention described herein may be manufactured and used by or for the Government of the United States of America for governmental purposes without the payment of any royalties thereon or therefor.

It is claimed:

1. In a trainer for simulation of proprioceptive motions of vertical ascent and attitude of a three-dimensional operational vehicle the improvement comprising:
   (a) an air cushion support vehicle including a base structure constructed to provide an air cushion under the base structure;
   (b) a trainer body mounted on said air cushion vehicle;
   (c) ground mounted fixed support means;
   (d) means including a plurality of actuators having selective control means;
   (e) said actuators being connected to said fixed support and aligned to transmit force to said trainer body and its air cushion support vehicle responsive to operation of said actuators to selectively adjust the attitude of said trainer; and
   (f) means for selectively varying the supply of air to said air cushion vehicle to selectively vary the ascent position of said trainer, and maintain air support for said air vehicle and trainer body.

2. A trainer according to claim 1,
   (a) said actuator means including separately actuated actuators for roll, pitch and yaw;
   (b) said actuators being positioned to provide roll, pitch, and yaw on three axes each normal to a plane through the respective other axes to permit adjustment of each function, roll, pitch, and yaw, without affecting the adjustment of the other two.

3. A trainer according to claim 2,
   (a) said fixed support means including a ground supported frame and a vertical column connected to said vehicle base and slidably connected to said ground supported frame to provide guided vertical movement of said air cushion vehicle and trainer body without affecting the roll, pitch and yaw adjustment of said vehicle and trainer body.

4. A trainer according to claim 3,
   (a) said column having a universal joint connection to said air cushion vehicle base and a laterally projecting horizontal plate fixed to said column to move therewith;
   (b) said roll and pitch actuators being connected to said plate and to said vehicle base to provide roll and pitch adjustment of said vehicle base.

5. A trainer according to claim 4,
   (a) said vehicle base structure having a forward end and a rear end;
   (b) said trainer body having a forward end with apertured section for forward view;

(c) said trainer body being mounted on said vehicle base with the respective forward end of each adjacent;
(d) said column universal joint being connected to said vehicle base at a point adjacent the rear end thereof to provide unobstructed view forward of said trainer body.

6. A trainer according to claim 4,
(a) said vertically movable column having a laterally projecting vertically positioned fin plate fixed thereto for engagement by said yaw actuators to rotate said vehicle base in yaw action about the vertical axis of said slidable column.

7. A trainer according to claim 1,
(a) said means for selectively varying the supply of air to said air cushion including an air compressor with automatic pressure sensitive control connected to said vehicle to maintain land support; and
(b) a manually operated override control connected to said compressor to vary the airflow to said vehicle to selectively adjust the ascent position thereof.

References Cited
UNITED STATES PATENTS 3,161,968  12/1964  De Boy et al. _____ 35—12
3,246,403  4/1966  Vaughen _____ 35—12

EUGENE R. CAPOZIO, Primary Examiner

P. V. WILLIAMS, Assistant Examiner